United States Patent [19]

Scott

[11] Patent Number: 5,852,631

[45] Date of Patent: *Dec. 22, 1998

[54] SYSTEM AND METHOD FOR ESTABLISHING LINK LAYER PARAMETERS BASED ON PHYSICAL LAYER MODULATION

[75] Inventor: Robert Earl Scott, Indian Rocks Beach, Fla.

[73] Assignee: Paradyne Corporation, Largo, Fla.

[*] Notice: The term of this patent shall not extend beyond the expiration date of Pat. No. 5,710,761.

[21] Appl. No.: 780,762

[22] Filed: Jan. 8, 1997

Related U.S. Application Data

[60] Provisional application No. 60/026,970, Sep. 20, 1996, and provisional application No. 60/022,474, Jun. 21, 1996.

[51] Int. Cl.$^6$ .................................................. H04L 29/10
[52] U.S. Cl. ........................................ 375/222; 379/93.32
[58] Field of Search .................................. 375/222, 223; 379/93.29, 93.31, 93.32, 93.33, 120; 370/252

[56] References Cited

U.S. PATENT DOCUMENTS

| | | | |
|---|---|---|---|
| 4,905,282 | 2/1990 | McGlynn et al. | 380/48 |
| 4,931,250 | 6/1990 | Greszczuk | 375/222 |
| 5,317,594 | 5/1994 | Goldstein | 375/222 |
| 5,425,080 | 6/1995 | Abbie | 379/91.01 |
| 5,491,720 | 2/1996 | Davis et al. | 375/222 |
| 5,710,761 | 1/1998 | Scott | 370/252 |

FOREIGN PATENT DOCUMENTS

| | | | |
|---|---|---|---|
| 0 418 165 | 3/1991 | European Pat. Off. | 375/222 |

*Primary Examiner*—Stephen Chin
*Assistant Examiner*—Jeffrey W. Gluck
*Attorney, Agent, or Firm*—Thomas, Kayden, Horstemeyer & Risley, L.L.P.

[57] ABSTRACT

A system and method for establishing a link layer connection between a calling modem having a plurality of possible first physical layer modulations and one or more possible link layer connections and an answering modem having a plurality of possible second physical layer modulations and one or more possible link layer connections comprising the steps of establishing a physical layer connection between the calling and the answering modems, wherein the physical layer connection is based on a negotiated physical layer modulation chosen from the first and second physical layer modulations, and establishing link layer connection based upon said negotiated physical layer modulation. The link layer connection includes parameters that are preset to default values based upon the negotiated physical layer connection. Thus, the modems are able to avoid the link layer negotiation, thereby providing a faster and more robust connection.

10 Claims, 8 Drawing Sheets

Calling Modem -- Cellular
FIG. 4

Answer Modem -- Cellular
FIG. 5

Calling Modem -- Central Site
FIG. 6

Answer Modem -- Central Site

SYSTEM AND METHOD FOR ESTABLISHING LINK LAYER PARAMETERS BASED ON PHYSICAL LAYER MODULATION

This application claims priority to and the benefit of the filing date of copending and commonly assigned provisional application entitled CELLULAR DATA PROTOCOL FOR QUICK CONNECTION, assigned Ser. No. 60/026,970, and filed Sep. 20, 1996; and copending and commonly assigned provisional application entitled A RAPID START UP PROTOCOL FOR COMMUNICATION BETWEEN A PLURALITY OF MODEMS, assigned Ser. No. 60/022,474, and filed Jun. 21, 1996.

FIELD OF THE INVENTION

The present invention generally relates to data communication protocols, and more particularly, to presetting the link layer parameters per the physical layer modulation in a protocol stack for modems.

BACKGROUND OF THE INVENTION

In an effort to facilitate more reliable and platform independent communication links between remotely located computers, communication protocols are typically organized into individual layers or levels comprising a protocol stack. The lowest layer is designed to establish host-to-host communication between the hardware of different hosts. The highest layer, on the other hand, comprises user application programs which pass customer data back and forth across the communication link. Each layer is configured to use the layer beneath it and to provide services to the layer above it.

Examples of two protocol stacks are the Opened Systems Interconnect (OSI) seven layer model and the Transmission Control Protocol/Internet Protocol (TCP/IP) five layer model. The OSI seven layer model comprises the following layers from lowest to highest: a physical layer, a data link layer, a network layer, a transport layer, a session layer, a presentation layer, and an application layer. When combined, the seven layers form a protocol stack that is designed to provide a heterogeneous computer network architecture. The TCP/IP five layer model comprises the following layers from lowest to highest: a physical layer, a data link layer, a network layer, a transport layer, and an application layer. Of particular relevance to the present invention is the implementation of the physical layer and data link layer in these systems.

The physical layer of the OSI model is the lowest layer and is concerned with establishing the electrical and mechanical connection between two modems. The data link layer is the second lowest layer of the OSI seven layer model and is provided to perform error checking functions as well as retransmitting frames that are not received correctly.

As is well known, a variety of standards exist which govern the protocols for communication between modems. For example, V.21, V.22, V.32, V.32bis, V.34, V.42, and V.42bis, are identifiers of differing communication standards recommended by the International Telecommunications Union (ITU). Each one of these is directed to an aspect of either the physical layer or data link layer of the OSI model.

The ITU Standard V.34 (hereafter referred to as V.34) is intended for use in establishing a physical layer connection between two remotely located computers over the Public Switch Telecommunications Network (PSTN). The V.34 standard includes the following primary characteristics: (1) full and half-duplex modes of operation; (2) echo cancellation techniques for channel separation; (3) quadrature amplitude modulation for each channel with synchronous line transmission at selectable symbol rates; (4) synchronous primary channel data signaling rates ranging from 2,400 bits per second to 33,600 bits per second, in 2,400 bit-per-second increments; (5) trellis coding for all data signaling rates; and (6) exchange of rate sequences during start-up to establish the data signaling rate. The features of V.34 are documented in the publicly-available ITU Standard V.34 Specification and are well known by those skilled in the art, and will not be described in detail herein.

Another significant feature of V.34, as it relates to the present invention, is the ability to automode to other V.-series modems that are supported by the ITU Standard V.32bis automode procedures. In this regard, V.34 defines signal handshaking that two connecting modems exchange at startup in order to learn the capabilities of the other modem to most efficiently exchange information.

While V.34 achieves efficient and generally high speed communication between two communicating modems, it nevertheless possesses several shortcomings that impede even more efficient operation. One significant shortcoming is the lengthy startup sequence which takes approximately 10–15 seconds. Particularly, for cellular customers, the ability to provide faster connections and faster data rates is particularly desirable since the cellular customer typically pays a charge for each cellular call based primarily on the length of the call and several other factors such as day of the week, time of day, roaming, etc. As a result, new fast connect protocols are being developed that provide for faster and more efficient startup operation based upon the system configuration and the path of the established communication link. An example of one such fast connect protocol is Paradyne Corporation's Enhanced Throughput Cellular 2 Quick Connect™ (ETC2-QC™). In essence, the ETC2-QC™ protocol uses techniques in the physical layer to reduce the physical layer startup time delay to about 1 second.

Of particular relevance to the present invention is the ITU Standard V.42 (hereinafter referred to as V.42). The V.42 standard is intended for use in establishing the error-correcting protocol of the data link layer connection. The V.42 standard includes a detection phase which determines whether both modems are capable of a an error-corrected connection, an exchanging identification phase for determining error-correcting parameter values and a link establishment phase for establishing the error-corrected connection. Under normal circumstances, V.42 requires approximately 1–3 seconds to establish an error-corrected connection. While this is relatively small in comparison to the establishment of a physical layer connection under V.34, it can essentially double the connection time when used in conjunction with fast connect modems.

Therefore, a heretofore unaddressed need exists in the industry for a system and method that reduces or eliminates the time required to establish a link layer connection so as to minimize the amount of time for establishing a connection between two modems.

SUMMARY OF THE INVENTION

The present invention overcomes the inadequacies an inefficiencies of the prior art as discussed hereinbefore and well known in the industry. The present invention provides a system and method for establishing a link layer connection between a calling modem having a plurality of possible first physical layer modulations and a plurality of possible link layer connections and an answering modem having a plurality of possible second physical layer modulations and a plurality of possible second link layer connections that comprises the following steps. One step includes establishing a physical layer connection between the calling and the answering modems, wherein the physical layer connection is based on a negotiated physical layer modulation chosen from the first and second physical layer modulations. Another step includes establishing a link layer connection based upon the negotiated physical layer modulation. This link layer connection includes parameters that are preset to default values based upon the negotiated physical layer connection. Thus, the modems are able to avoid the link layer negotiation that essentially all other modems perform, thereby providing a faster and more robust connection.

Other features and advantages of the present invention will become apparent to one with skill in the art upon examination of the following drawings and detailed description. It is intended that all such additional features and advantages be included herein within the scope of the present invention, as defined by the claims.

DESCRIPTION OF THE DRAWINGS

The present invention can be better understood with reference to the following drawings. The elements of the drawings are not necessarily to scale, emphasis instead being placed upon clearly illustrating the principles of the present invention. Furthermore, like referenced numerals designate corresponding parts throughout the several views.

DETAILED DESCRIPTION OF THE PREFERRED EMBODIMENT

The following description is of the best presently contemplated mode of carrying out the present invention. This description is not to be taken in a limiting sense, but is made merely for the purpose of describing the general principles of the invention. Consequently, the scope of the invention should be determined by referencing the appended claims.

The following description is divided into two parts. The first part discloses an example of a fast connect protocol for use in a modem system that is suitable for operating in conjunction with the present invention. It should be noted that the modem system disclosed in the first part is merely illustrative of a system that can benefit from the present invention, as will be evident to those of ordinary skill in the art upon reading the following disclosure. The second part discloses the present invention in the context of the fast connect modem system described in the first part. However, the present invention is equally well suited for application outside the context of the fast connect modem system described herein, for example, with modems that connect slowly.

I. Physical Layer Connection

Figure 1:
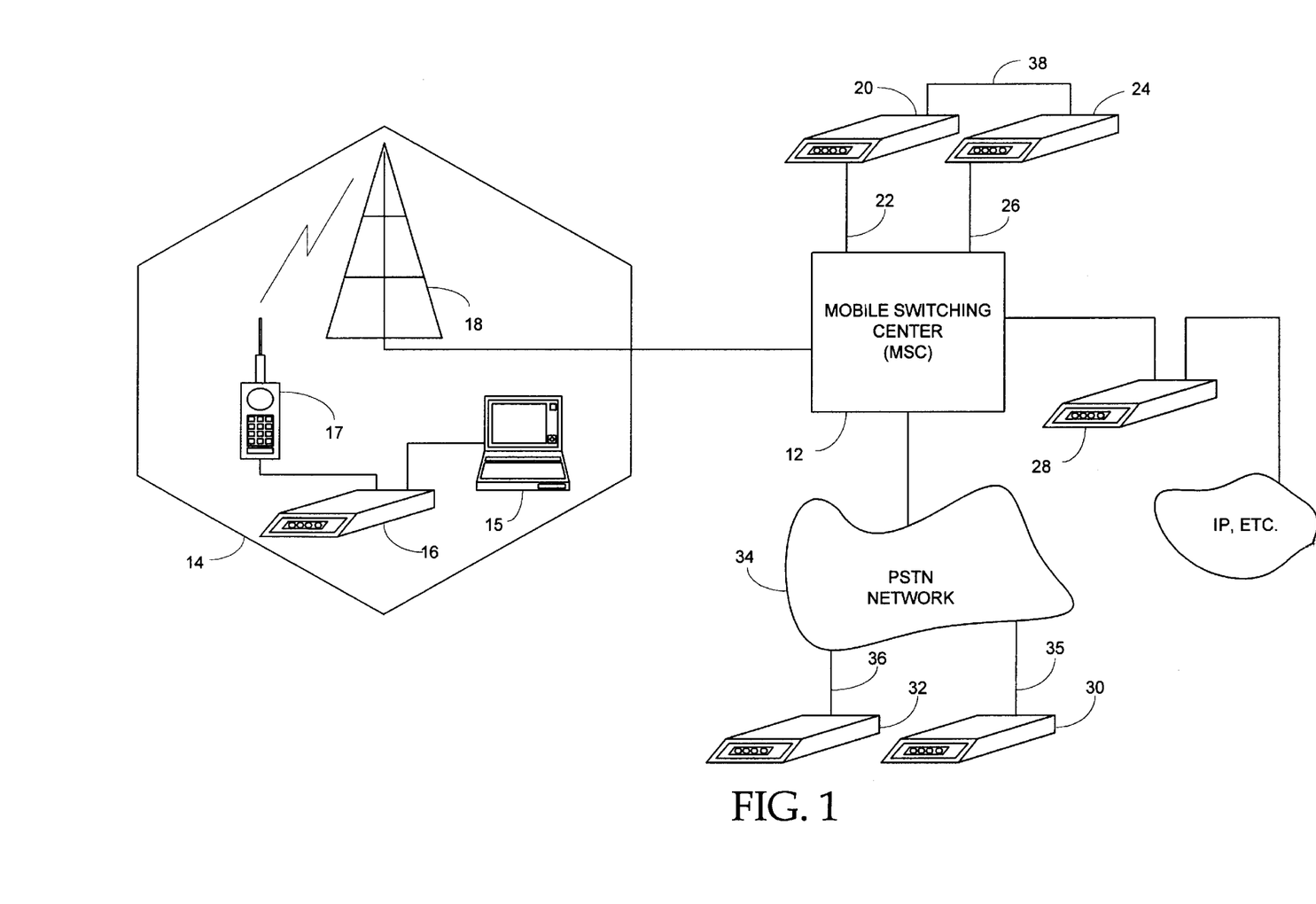
FIG. 1 is a system diagram, illustrating a multi-modem system, wherein a plurality of modems are interconnected among a plurality of communication links.

Turning now to the drawings, FIG. 1 shows a system diagram of a system illustrating multiple modems intercommunicating through a variety of mediums, including cellular and PSTN. Indeed, as previously mentioned, a driving factor in the development of the present invention was to design a system that provided improved reliability in data communication over a data communication link. This goal has been achieved by removing the necessity to perform error-correction negotiation during the connect sequence in modem communication so as to reduce the overall connection time.

As illustrated, a cellular modem system may be disposed for communication with a mobile switching center (MSC) 12. More specifically, a cell 14 includes a portable computer 15 that is connected via a cellular modem 16 to a cellular phone 17, which in turn communicates (wirelessly) with a cell tower 18 that communicates with the MSC 12. It is appreciated that the modem 16 recognizes that it is on the cellular side via a strap or configuration setting, or alternatively by a direct connect sensing of the cellular phone. Therefore, and as will be discussed in more detail below, the modem 16 will know that it is capable of communicating in accordance with a modulation standard capable of performing a fast connect sequence as described below.

The MSC 12 is also connected to a data gateway comprising modems 20 and 24. The modems 20 and 24 are illustrated as connected in a back-to-back configuration and communicating to the MSC 12 over links 22 and 26. As will be appreciated and discussed below, the links 22 and 26 will support different communication protocols, or different modulation standards. The modem pool provides a data gateway for interfacing data calls originating from the modem 16, and thereby, allows cellular specific protocols to be used over the wireless connection between modems 16 and 20, as described below.

By way of definition, a "Central-site" modem is one that is capable of supporting the modulation standard of the present invention, and is not connected to a cellular phone. In this regard, all central-site modems are connected via four-wire connections. Examples which are illustrated in FIG. 1 include a mobile switching center MSC(Cellular) modem 20, an MSC(PSTN) modem 24, an MSC(Single-ended) modem 28, and a PSTN(ETC2-QC™) modem 30—where an MSC modem is one that is connected at the mobile switching center 12. A significant distinction among these various types of modems relates to the startup sequence, which will differ slightly depending upon the type of central-site modem. Preferably, a hardware identifier, such as a DIP switch or a firmware option configurable at modem installation, defines the type of modem for purposes of the startup sequence.

In keeping with the description of FIG. 1, modem 20 is illustrated as an MSC(Cellular) modem that is connected in a back-to-back mode with modem 24, an MSC(PSTN) modem. Modem 20, therefore, is designed to support the ETC2-QC™ modulation protocol and simulate a cellular modem during the initial modem startup routine. Modem 28 is an MSC(Single-ended) modem that, although it may communicate with modems on the PSTN 34, will typically communicate only with cellular modems. Indeed, when communicating with cellular modems, the 2100 Hertz tone, which is typically inserted to disable echo cancellers, is preferably omitted. Advantageously, elimination of this tone achieves a faster and more desirable modem startup.

A PSTN(ETC2-QC™) modem 30 and a standard PSTN modem 32 are connected via PSTN 34 to the MSC 12. The modem 30 is connected to the PSTN 34 via a four-wire connection 35, and modem 32 via a two-wire connection 36. Consistent with the concepts and teachings of the present invention, the four-wire connection 35 facilitates the communication of modem 30 with the cellular modem 16, for example, in the ETC2-QC™ modulation standard. However, as will be appreciated by those of ordinary skill in the art, merely ensuring a four-wire connection 35 alone will not ensure proper system operation in accordance with the present invention. In this regard, such a four-wire connection 35 may nevertheless pass through a two-wire connection, and thus a hybrid converter circuit, at the central office. In this event, echo will be injected into the signal and the abbreviated modulation standard of the present invention may be compromised. There are, however, steps that may be taken to ensure proper operation of the invention. These include, (1) ordering a Direct Inward Dial connection and instructing the phone company to avoid a two-wire connection for that setup; (2) obtaining a direct T1 connection to the Interexchange Carrier (for example, a "1-800" number); and obtaining an ISDN PRI connection, as it will always support four-wire for both call origination and call answer.

By way of illustration, consider a call originated by the computer 15 and cellular modem 16 to the standard PSTN modem 32. The established communication link will pass through the cellular phone 17 to the cell tower 18, through the MSC 12, across link 22 to the MSC(Cellular) modem 20 and to the connected modem 24 via RS-232 connection 38, across link 26 and back through the MSC 12 to the PSTN 34, and ultimately across the two-wire link 36 to modem 32. As will become clear from the description that follows, the cellular modem 16 and the MSC(Cellular) modem 20 will connect and startup in accordance with the fast connect communication protocol described herein. However, since the established communication link that passes from modem 24 to modem 32 passes through a PSTN 34 and a hybrid converter, then the communication protocol of the present invention will not be adequately supported. Accordingly, the modems 24 and 32 will identify this situation and will connect and communicate using an alternative communication protocol supported by both modems and capable of effective transmission across the established link. In this regard, the overall communication link does not realize the fast connection.

Indeed, an aspect of the fast connect protocol described herein is the determination of whether both modems are compatible, in terms of communication protocol, and whether they are connected through a line that passes through a PSTN. If the modems are compatible and the established communication link is outside a PSTN (e.g., cellular to MSC) or is to a PSTN modem with a 4-wire connection that has been configured for supporting a fast connect protocol, then the modems may connect and begin their startup sequence. In this regard, the fast connect communication protocol is designed to be fast as well as robust, and is accomplished by the use of simple tones. The use of such simple tones facilitates the implementation of the automatic mode select to be in the modem's control processor rather than the digital signal processor (DSP) chip.

In addition to the fast connect protocol discussed below, the fast connect protocol also includes several "fallback" modulations. More particularly, the modem of the present invention will preferably include Paradyne Corporation's Enhanced Throughput Cellular 1™ (ETC1™), V.34, V.32bis, V.32, and V.22bis modulations. Thus, in the previous example, modems 24 and 32 may communicate using one of these communication protocols. These modulation protocols are documented and will be understood by persons of ordinary skill in the art, and will not be discussed herein. It suffices to say that supporting the above-listed modulation standards greatly enhances the flexibility and versatility of a fast connect modem.

Figure 2:
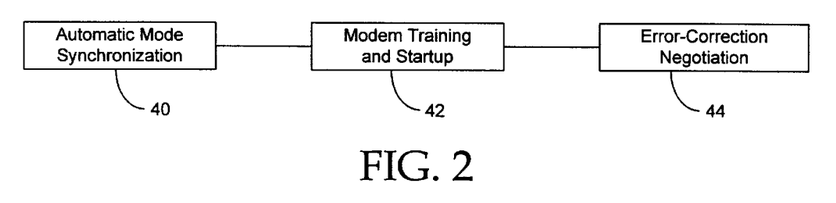
FIG. 2 is a diagram illustrating the primary handshaking and data exchange sequences between a calling and an answer modem.
Figure 3:
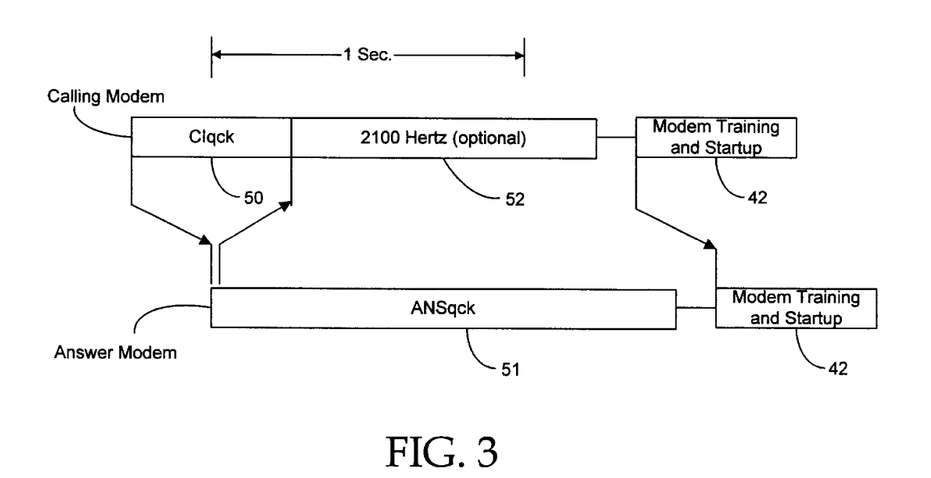
FIG. 3 is a timing diagram similar to FIG. 2, illustrating the signal exchange during the automatic mode synchronization sequence of FIG. 2.

To more particularly describe the initial startup sequence in accordance with the modulation standard of the fast connect modem, reference is made to FIGS. 2 and 3. FIG. 2 illustrates the three principal components of modem exchange or communication. After the cellular modem initiates the call, such that a communication link is established, the modems enter a mode select sequence, referred to herein as automatic mode synchronization 40. During this period, the modems exchange parameters that identify the modems, and thus, their communication protocol. This sequence 40, thus, synchronizes the modems for communication in accordance with the same standard or protocol, such as V.34, V.22, V.22bis, etc.

Once the modems have synchronized their communication protocol, or modulation standard, then they enter a training and startup sequence 42. In a manner known in the art, during this sequence the modems may test the established communication link for noise, bandwidth, etc., in order to determine an appropriate rate for communication. The modems may also operate during this period to train their internal echo cancellers by, for example, ranging the established link of communication. In accordance with a related aspect of the fast connect modems, under certain circumstances the modem training and startup sequence may also be significantly shortened to provide a more robust (both time-shortened and reliable) startup sequence. More particularly, the "circumstances" which provide such a robust startup include communicating modems constructed in accordance with the invention detecting an established link of communication that does not pass through any two-wire connections. The completion of this sequence signifies the establishment of a physical layer connection between two modems.

After the physical layer has been established, the communicating modems enter the information exchange/communication sequence, referred to herein as error-correction negotiation 44, in order to establish the link layer connection. This is of particular relevance to the present invention in that it includes negotiation of a error-correcting protocol such as V.42. During this sequence 44, the modems detect whether they are error-correcting modems and, if so, they negotiate the error-correcting parameters.

Referring now to FIG. 3, the initial automatic mode synchronization 40 is illustrated. As shown, this sequence is executed by exchanging signals between the calling modem and the answer modem. After the calling modem instructs the cellular phone to establish the communication link with the answer modem, it transmits the calling signal CIqck 50. As will be described in more detail in connection with the flowcharts of FIGS. 4–7, this signal may comprise a 1900 hertz tone, or alternatively may comprise a 1500 hertz tone modulated with a 1900 hertz tone. If only a 1900 hertz tone is transmitted as Ciqck signal 50, then the answer modem knows that the calling modem is configured as a Central Site, four-wire modem (see FIG. 6). Alternatively, if the CIqck signal includes both 1500 and 1900 hertz components, then the answer modem knows that the calling modem is configured as a cellular modem.

As will be appreciated by those of ordinary skill in the art, other calling signals may be transmitted by the calling modem. For example, calling signals consistent with that of a facsimile transmission, or calling signals consistent with other modem modulation standards, such as V.34, V.32, V.32bis, etc., may be transmitted. Since automatic connection and synchronization to facsimile, and these other modulation standards, are well known it will not be discussed herein. Indeed, the significance of the fast connect protocol is achieved when both the calling modem and the answer modem are capable of communicating in accordance with the fast connect modulation protocol herein described so that through the exchange of tones, the modems are made aware of the possible shortcuts in the fast startup and training sequence 42, and more particularly, in the error-correction negotiation 44.

Once the CIqck signal 50 is received by the answer modem, then the answer modem transmits its response back to the calling modem. The purpose of this answer signal is not only to signal receipt of the calling signal, but also to uniquely identify the answer modem. Again, as is known in the art, this answer signal may comprise ANS or ANSam signals as are known by the V.34 and V.32bis communication protocols. If so, the calling modem will then startup and train 42 and perform error-correction negotiation 44. Significant to the present invention, however, is when the answer signal is ANSqck, which is defined by either a 1680 hertz tone or an 800 hertz tone.

Figure 4:
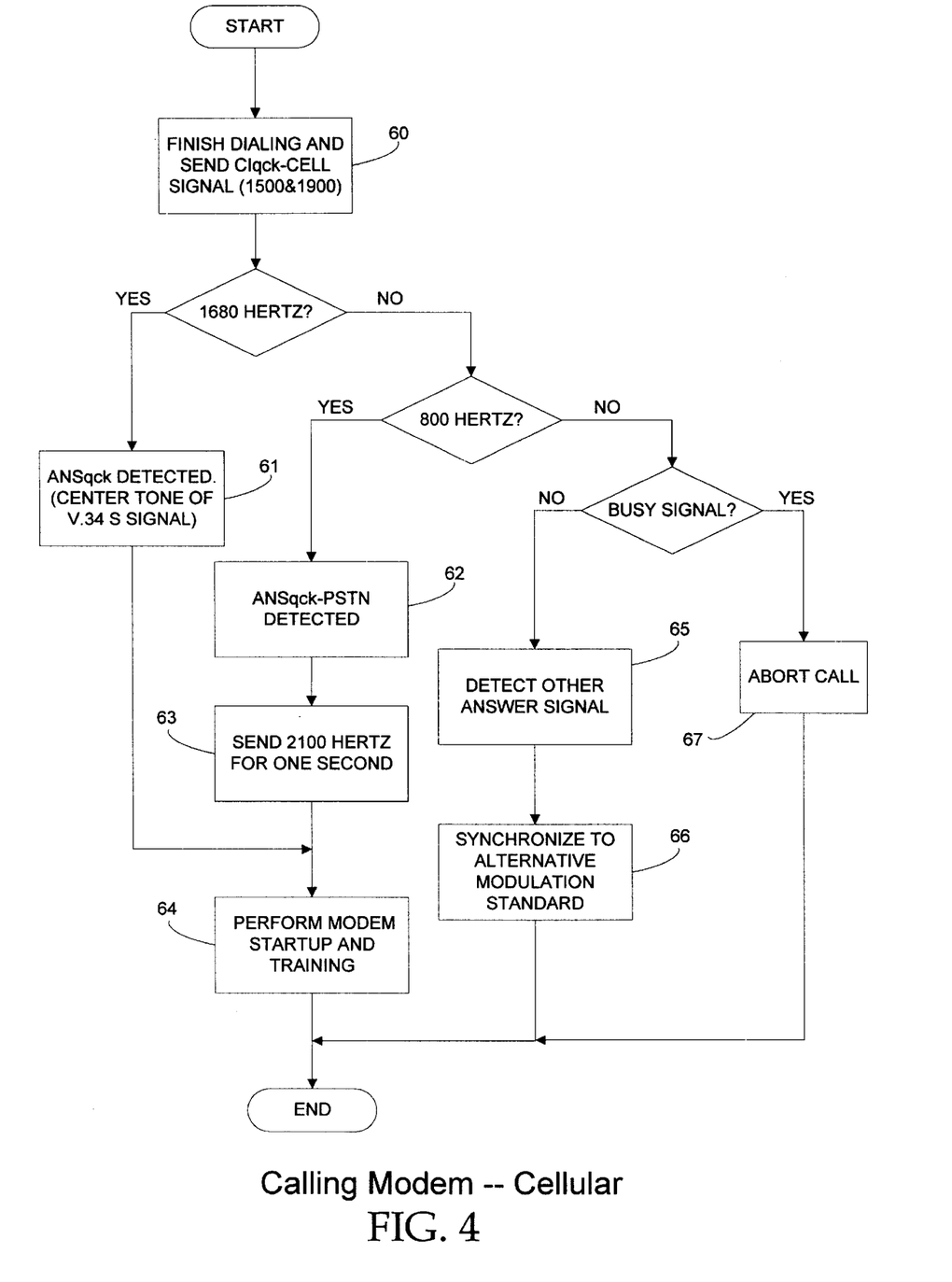
FIG. 4 is a software flowchart illustrating the operation of the present invention when the calling modem is a cellular modem.

As illustrated in FIG. 4 (assuming the calling modem is a cellular modem), if ANSqck is an 800 hertz tone, then the calling modem knows that the answer modem is configured as a four-wire connection, and can communicate with the calling modem in accordance with the fast connect communication protocol and, in accordance with the present invention, set the error-correction parameters to preset values so as to avoid the necessity of negotiating the parameters. In addition, the 800 hertz ANSqck signals the calling modem that the answer modem is connected to a PSTN 34 (see FIG. 1). Therefore, the calling modem transmits a 2100 hertz tone for approximately one second. This, as is known, serves to pad the initial two second connect period, as required by the FCC for billing purposes. Furthermore, it serves to disable the echo cancellers within the PSTN 34.

If ANSqck is a 1680 hertz tone, which is the center tone of V.34 S signal, then the calling modem knows that the answer modem is configured as a four-wire connection, and can again communicate with the calling modem in accordance with the fast connect communication protocol and, in accordance with the present invention, set the error-correction parameters to preset values so as to avoid the necessity of negotiating the parameters. More significantly, it tells the cellular calling modem that the answer modem is not connected to the PSTN 34. Therefore, both the calling modem and the answer modem can determine that the established communication link is entirely outside the PSTN 34. Accordingly, the Federal Communications Commission (FCC) billing delay need not be inserted. Furthermore, certain assumptions may be made in regard to bandwidth, or transmission quality. For example, the established communication link will not pass through echo cancellers, and as a result, the calling modem need not transmit the 2100 hertz tone. Instead, upon receiving the ANSqck answer signal, the calling modem may immediately enter the modem training and startup sequence 42.

As will be further appreciated by those of ordinary skill in the art, by making certain assumptions regarding the line quality of the established link, the modem training and startup sequence 42 may be shortened. For example, in the preferred embodiment, the system initiates communication by assuming a 9600 baud rate. It has been found that most cellular connections may transmit at this rate, and certain front-end savings may be realized by defaulting to this initial startup rate. Of course, this rate may be increased, or autorated upwardly, in accordance with methods known in the prior art, after the initial startup and training sequence 42 has been completed.

Referring back to FIG. 4, a top-level flowchart is shown, illustrating the automatic mode synchronization of a cellular calling modem constructed in accordance with the fast connect protocol disclosed herein. Once the calling modem has completed transmitting the dialing sequence, it transmits the CIqck signal, which for a cellular calling modem includes modulated 1500 and 1900 hz tones, as indicated in block 60. Once the calling signal has been transmitted, the calling modem will wait to receive the answer signal from the answer modem. In order to exchange data using the modified modulation standard of the present invention, the calling modem looks to receive one of two answer signals. The first valid answer signal as in 1680 hz tone, which is the center tone of the V.34 S signal, as indicated in block 61. This tone signals to the calling modem that the answer modem is not only compatible to transmit in the fast connect modified modulation standard, but further indicates that the answer modem is connected via four wire connections, and does not interconnect to a PSTN. Accordingly, since the calling modem is a cellular modem, then the established communication link does not pass through a PSTN and the initial two second FCC-required delay need not be inserted into the start-up sequence. Moreover, since the entire communication link is four wire, then the modems need not transmit the 2100 hz signal to disable echo cancellors.

A second valid answer signal is an 800 hz tone, as shown by block 62, which also indicates that the answer modem is connected via four wire, and therefore, can communicate in accordance with the fast connect modulation protocol. In addition, the 800 hz tone indicates that the answer modem is connected to a PSTN. Assuming, as previously discussed, that the requisite steps have been taken to ensure that the established communication link does not pass through a two wire connection, then certain savings or efficiencies can be gained during the modem start-up and training sequences (e.g., eliminate echo training since no hybrid circuits are present in the communication link). Nevertheless, the FCC-required delay must be inserted and, therefore, a 2100 hz tone is transmitted at block 63 by the calling modem for a duration of approximately one second. The amount of the 2100 hz tone will "pad" the total modem automode and startup time to two seconds. This ensures that no customer data is transferred in the first two seconds (which meets FCC requirements). Thereafter, calling modem proceeds with the modem training and start-up sequence at block 64.

If neither of the foregoing answer signals are received, then the system operates to determine whether another valid answer signal has been transmitted from the answer modem. The step of block 65 broadly designates this function. It should be appreciated that well known answer signals such as ANS or ANSam may be transmitted by the answer modem and, if received, the calling modem may synchronize to the appropriate modulation standard, as indicated in block 66. Although not separately designated in the figure, it should be further appreciate that if no valid answer signal is received by the calling modem within a given period of time, the calling modem will time out and abort the attempted communication. Also, and as illustrated at block 67, the calling modem will abort the attempted communication if a busy signal is received.

Figure 5:
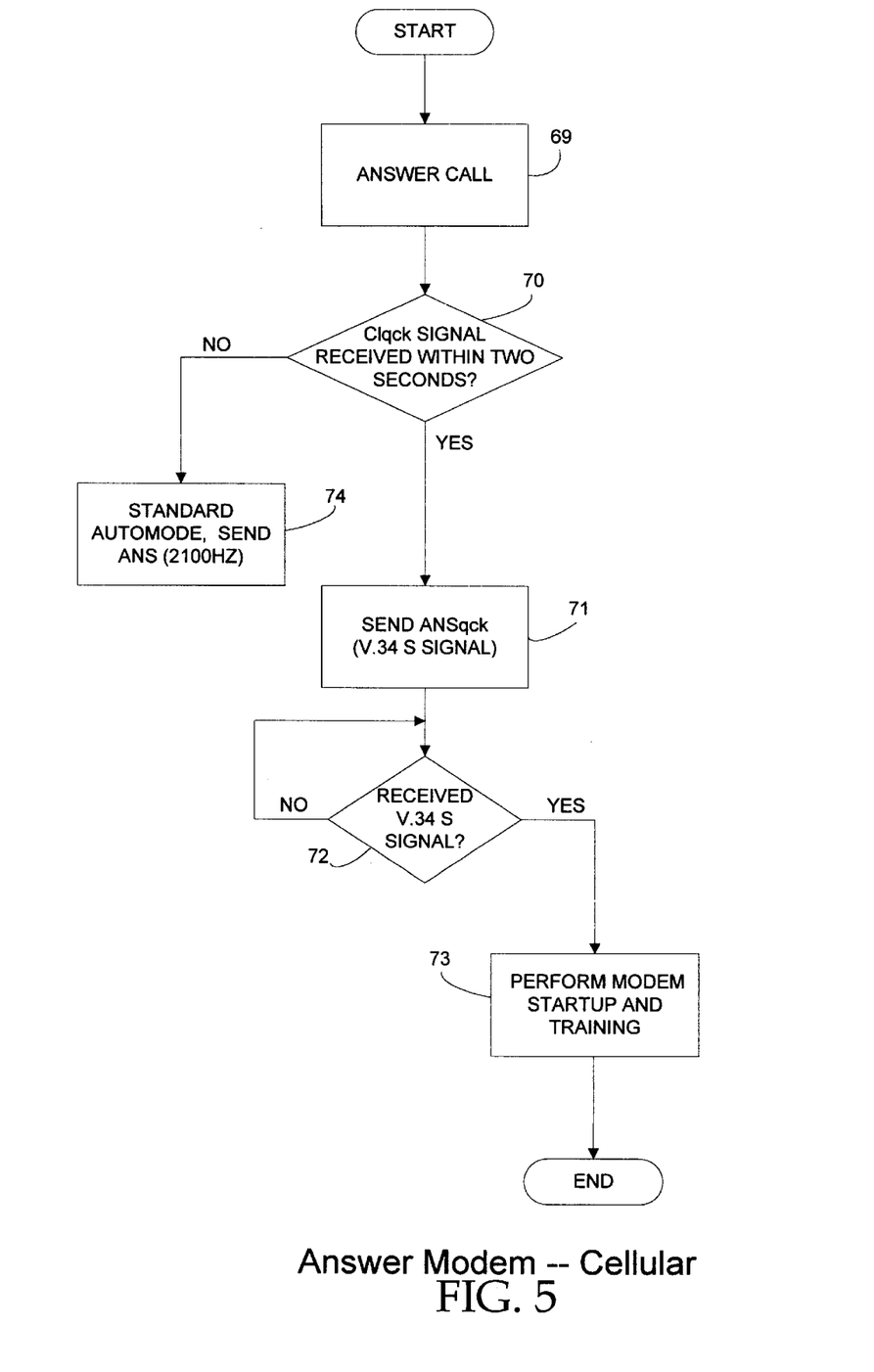
FIG. 5 is a software flowchart illustrating the operation of the present invention when the answer modem is a cellular modem.

FIG. 5 shows a top-level flowchart illustrating the operation of a cellular answer modem constructed in accordance with the fast connect communication protocol described herein. Once the communication link has been established and the call answered at block 69, the answer modem looks to detect the CIqck calling signal, as indicated by block 70. In the presently described fast connect protocol, cellular to cellular modem communications are not supported. Therefore, a cellular answer modem will assume that a calling modem transmitted a CIqck signal will transmit only a 1900 hz tone rather than the modulated 1500 and 1900 hz tones. Having said this, it should be appreciated that cellular-to-cellular communications could be supported.

In keeping with the description of FIG. 5, once the answer modem has received the CIqck calling signal, it transmits the ANSqck answer signal at block 71. It then waits for the calling modem to enter the modem start-up and training sequence. This sequence is identified by receiving the S signal as assigned by the V.34 modulation standard, as indicated by the decision block 72. Once this signal is received, then the answer modem will transmit back to the calling modem the appropriate S signal, so as to initiate the startup and training sequence 42.

Alternatively, if the answer modem, within a period of two seconds, has not received CIqck calling signal, then it will proceed with the start-up sequence in accordance with an alternative modulation standard. This, therefore, assumes that the modified communication protocol of the present invention is not supported by the calling modem, and the answer modem will typically respond to the calling signal of an alternative communication signal by transmitting a 2100 hz tone, as indicated in block 74.

Figure 6:
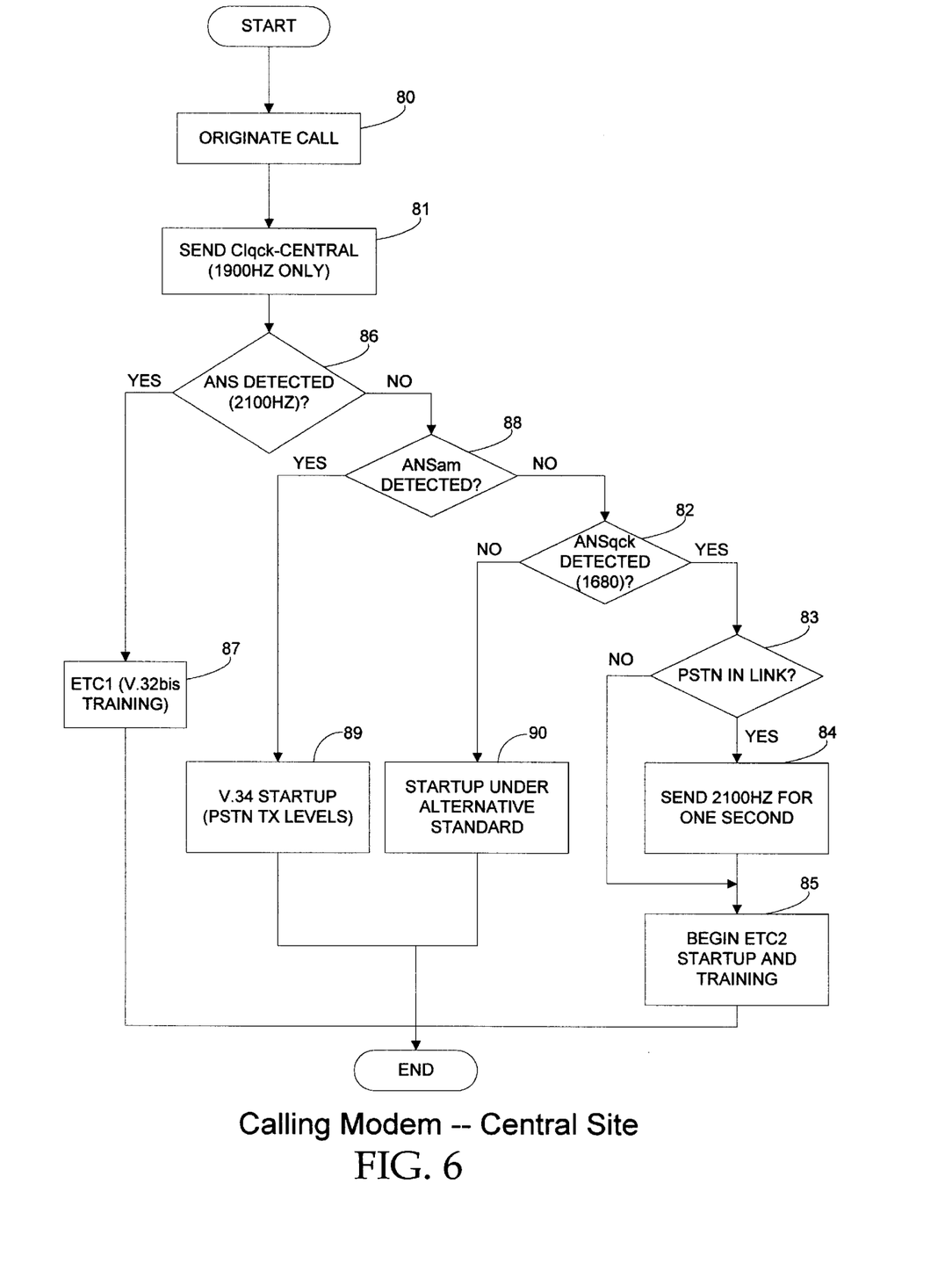
FIG. 6 is a software flowchart illustrating the operation of the present invention when the calling modem is a Central-site modem.

Referring now to FIG. 6, a software flowchart illustrating the top-level operation of a central site calling modem is shown. As depicted, the calling modem originates the call and establishes a communication link at block 80. Once the communication link is established, the calling modem transmits the CIqck calling signal at block 81, which in the case of a central site calling modem comprises a 1900 hz signal tone. If the 1680 hz ANSqck answer signal is detected at block 82, then the calling modem recognizes the answer modem as one capable of transmitting pursuant to the fast connect communication protocol. Thereafter, the calling modem must determine the network configuration of the established communication link, as indicated in block 83. That is, the central site calling modem will determine whether the established communication link passes through a PSTN or not. If it is determined that the established link passes through a PSTN, then, as in the case of the cellular calling modem, the calling modem transmits a 2100 hz signal for approximately one second at block 84. Thereafter, the calling modem enters the modem start-up and training sequence, as indicated in block 85.

Alternatively, if the calling modem detects the ANS answer signal (2100 hz) at block 86, then it communicates with the answer modem using the ETC1™ communication protocol and the V.32bis training, as indicated by block 87. If the ANSam answer signal is detected at block 88, then the modem will startup in standard V.34 mode at block 89, which is well known in the art and therefore not described herein. The modem will also monitor for ANSqck at block 82, which in this example is a 1680 Hz tone. If this is not detected, then the modem will startup under an alternate low speed standard at block 90, which is well known in the art and therefore not described herein. If ANSqck is detected, then the modem will operate differently depending on whether it is connected to the PSTN network or not, as indicated by block 83. The modem will know whether it is connected to the PSTN via a configuration option which was set at installation. If connected to the PSTN, then the modem will transmit a 2100 Hz tone for one second at block 84 then proceed to the ETC2™ training sequence at block 85. If the modem is not connected to the PSTN at block 83, then it can proceed directly to the ETC2™ training sequence at block 85, avoiding the additional one second of startup shown at block 84.

Figure 7:
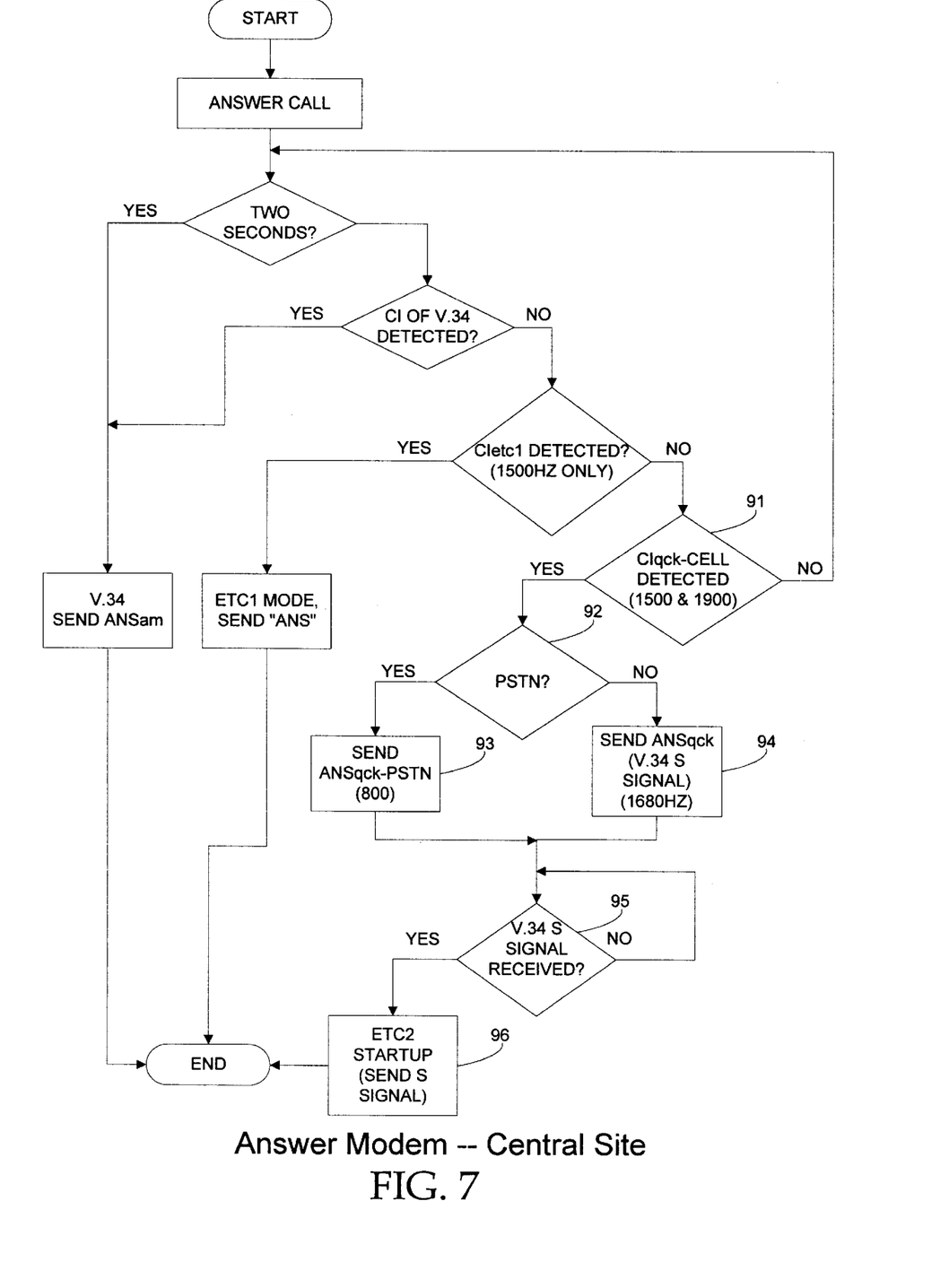
FIG. 7 is a software flowchart illustrating the operation of the present invention when the answer modem is a Central-site modem.

Reference is now made to FIG. 7, which is a software flowchart illustrating the top-level operation of a central site answer modem. As illustrated in the flowchart, and in accordance with the presently disclosed fast connect protocol, when the answer modem is a central-site modem, it assumes that any transmissions made in accordance with the modulation standard with the present invention will be via a communication link with a cellular calling modem. Therefore, block 91 indicates detection the CIqck calling signal in the form of a modulated 1500 and 1900 hz tones, as transmitted by cellular calling modem. If the CIqck calling signal is detected, then the answer modem determines the network configuration at block 92. More specifically, the answer modem determines whether the established communication link passes through a PSTN or not. In the event that the established link does in fact pass through a PSTN, then the answer modem will transmit an 800 hz ANSqck answer signal at block 93. As illustrated in FIG. 4, this instructs the calling modem to transmit the 2100 hz tone. Alternatively, the answer modem will transmit the 1680 hz tone, which instructs the calling modem to proceed directly with the modem start-up and training sequence at block 94. Thereafter, the answer modem will await transmission of the S signal in accordance with the V.34 start-up sequence, as indicated by block 95. Thereafter, the answer modem will respond by transmitting the S of the V.34 start-up, as indicated by block 96. Since the V.34 start-up sequence is well-known in the art, it would not be described herein.

The remainder of the flowchart depicted in FIG. 7 illustrates the central-answer modem operation and connects sequence in accordance with alternative standards that are well-known in the prior art and need not be discussed herein.

Accordingly, at the completion of the automatic mode synchronization sequence 40 (FIG. 2), the modems enter into a training and start-up sequence 42. As mentioned above, in the training and startup sequence 42 the modems test the established communication link for noise, bandwidth, etc., in order to determine the appropriate rate for communication. This is performed using the modulation scheme determined in the automatic mode synchronization sequence 40 as illustrated in FIGS. 4, 5, 6, and 7. For purposes of the following discussion, it is assumed that the call and the answer modems are capable of communicating with one another using a fast connect protocol. Consequently, since the call modem knows what type of modem it is and what type of modem the answer modem is, certain shortcuts can be taken during the training and startup sequence 42 so as to reduce the overall connection time. Specifically, the modems can default to preset values that eliminate the need for probing, ranging and half-duplex training. Thus, the modems merely perform a special full-duplex training mode during the training and start-up sequence 42 which results in a much faster connection.

Particularly, the probing and ranging sequences are bypassed and the file parameters are assumed in ITU Standard V.8, INFO0, and INFO1. As an example, in ITU Standard V.8, the data call, the LAPM and the full-duplex training parameters are preset to default values if the tones exchanged during automode sequence indicate that both modems are capable of fast connect operation. Further, in the INFO sequences, the 4 point train, 2800 L symbol rate, the power level drop, and preemphasis filter can also be preset to default values. Thus, the ITU Standard V.8 and INFO sequences are eliminated.

At the completion of the training and start-up sequence 42, the modems have established a physical layer connection and are ready to establish the second layer connection, referred to as the link layer connection, via an error-correction negotiation sequence 44 in accordance with the present invention, as disclosed below.

II. Link Layer Connection

The link layer is the second layer of the ISO model protocol stack and includes negotiating and establishing an error-correcting connection such as with ITU Standard V.42 or Microcom Networking Protocol (MNP). The link layer connection follows the physical layer connection and uses the physical layer in establishing the error-corrected connection. It is noted, however, that conventional wisdom to date has maintained the link layer connection be independent of the physical layer connection when establishing a connection between two modems. In contrast, the present invention establishes the link layer connection based upon the modulation chosen in the physical layer connection during the automatic mode synchronization sequence 40 (FIG. 2). Thus, the steps for establishing an error-correcting protocol are eliminated and the link layer connection is established substantially instantaneously upon the completion of the physical layer negotiation. This not only reduces the amount of time required to establish a connection between two modems, it makes the connection more robust by removing the necessity of performing additional handshaking that, if corrupted for whatever reason, will result in a disconnect or call connect failure.

By way of example, the ITU Standard V.42 (hereafter referred to as V.42) comprises a detection phase, and exchange identification (XID) phase, and a link establishment phase, all of which are briefly discussed below. A more detailed explanation of V.42 can be found in the publicly-available ITU (CCITT) Recommended Standard V.42 documentation.

The detection phase is provided to determine whether the answer modem supports an error-correcting protocol. This phase is designed to avoid the potential disruptions to the answer DTE that could occur if the calling modem immediately enters the XID phase and the answering modem was not capable of an error-correcting communication. However, the detection phase is optional and may be disabled. If the call modem determines that the answering modem does not support a V.42 error-correcting protocol, there are often times fall-back error protocols provided by the calling modem, such as in the case of V.42, where MNP is provided as a fall-back error-correcting protocol. Alternatively, if the answer modem does not support V.42 nor MNP, then no error-correcting protocol is established and a connect message is issued by the modems to their respective digital terminal equipment so that user data can be transmitted between the two modems.

The XID phase is provided for the negotiation of the error-correcting parameter values. These parameters essentially govern the error-correcting operation of the modems once the connection is established. As with the detection phase, the XID phase may be omitted if default parameter values are acceptable. For example, the following are provided as the default parameters values in the V.42 standard: Standard Reject, 16 bit FCS (Frame Check Sequence), V.42bis compression disabled, Frame Length (N401) of 128 octets, and Window Size (k) of 15 frames. However, the default settings are more often than not undesirable because, for example, most modems wish to negotiate Selective Reject, V.42bis data compression, and longer Frame Lengths and Window Sizes.

Lastly, the link establishment phase is provided for actually making the error-corrected connection between the two modems. In V.42, this is implemented via a set asynchronous balanced mode extended (SABME) command. The SABME command is used to place the addressed error-corrected entity (i.e., the answering modem) into the connected state. The error-correcting entity then confirms acceptance of the SABME command by the transmission of an unnumbered acknowledgment (UA) response. By acceptance of this command, the error-corrected connection is essentially established and the modems then send a connect message to their respective data terminal equipment, such as computer 15 (FIG. 1).

Unlike the detection phase and the XID phase, the link establishment phase is not optional and must be performed under V.42. Thus, in a best case scenario, only the link establishment phase is performed, which takes approximately 0.5 seconds. If all three phases are performed, then the link layer connection may take three or more seconds.

Therefore, establishing an error-corrected connection with V.42 can take up to three seconds, depending on what defaults are set in the system. While this amount of time does not seem significant relative to the time required for establishing a physical layer connection via V.34 modulation (e.g., approximately 10–15 seconds), it is considerably more noticeable when a fast connect protocol is utilized that can establish a physical layer connection in about 1 second. Thus, when using a fast connect protocol, the error-correction negotiation can easily double the connect time, not to mention introduce a greater opportunity for failure by requiring additional handshaking.

Accordingly, the present invention enables an error-corrected connection without having to perform the steps described above with regard to V.42, or those steps associated with other error-correcting protocols as known in the art. The present invention achieves this by presetting the XID phase parameters to default values that are based upon the negotiated physical layer connection. Therefore, when two multi-mode modems negotiate a physical layer connection, the link layer connection can be immediately established based upon the negotiated physical layer modulation. For example, in the embodiment described above in Section I, the exchange of tones in the mode synchronization sequence 40 indicates to each modem the type of modem it is communicating with, and therefore, certain assumptions can then be made regarding the error-correction negotiation sequence 44 so as to eliminate the steps normally performed to establish an error-corrected connection. In the preferred embodiment of the present invention with the V.42 standard, the following parameters are set to the indicated default values when the two modems are capable of the fast connect sequence described above: Selective Reject, 16 bit FCS, 64 bit Maximum Frame Size (transmit and receive directions), 8 Frame Window Size (transmit and receive directions), V.42bis enabled, and 1,024 bit dictionary (transmit and receive directions). It should be noted, however, that one of ordinary skill in the art would recognize that these default values are merely illustrative settings and that different default values can be used. Moreover, each different type of connect sequence would preferably have its own set of default values. If it is determined by the modems in the mode synchronization sequence 40 that one or the other is not capable of a fast connect as described above, then the modems essentially fallback and perform an alternative error-correction sequence such as the recommended ITU Standard V.42 error-correction sequence.

Figure 8:
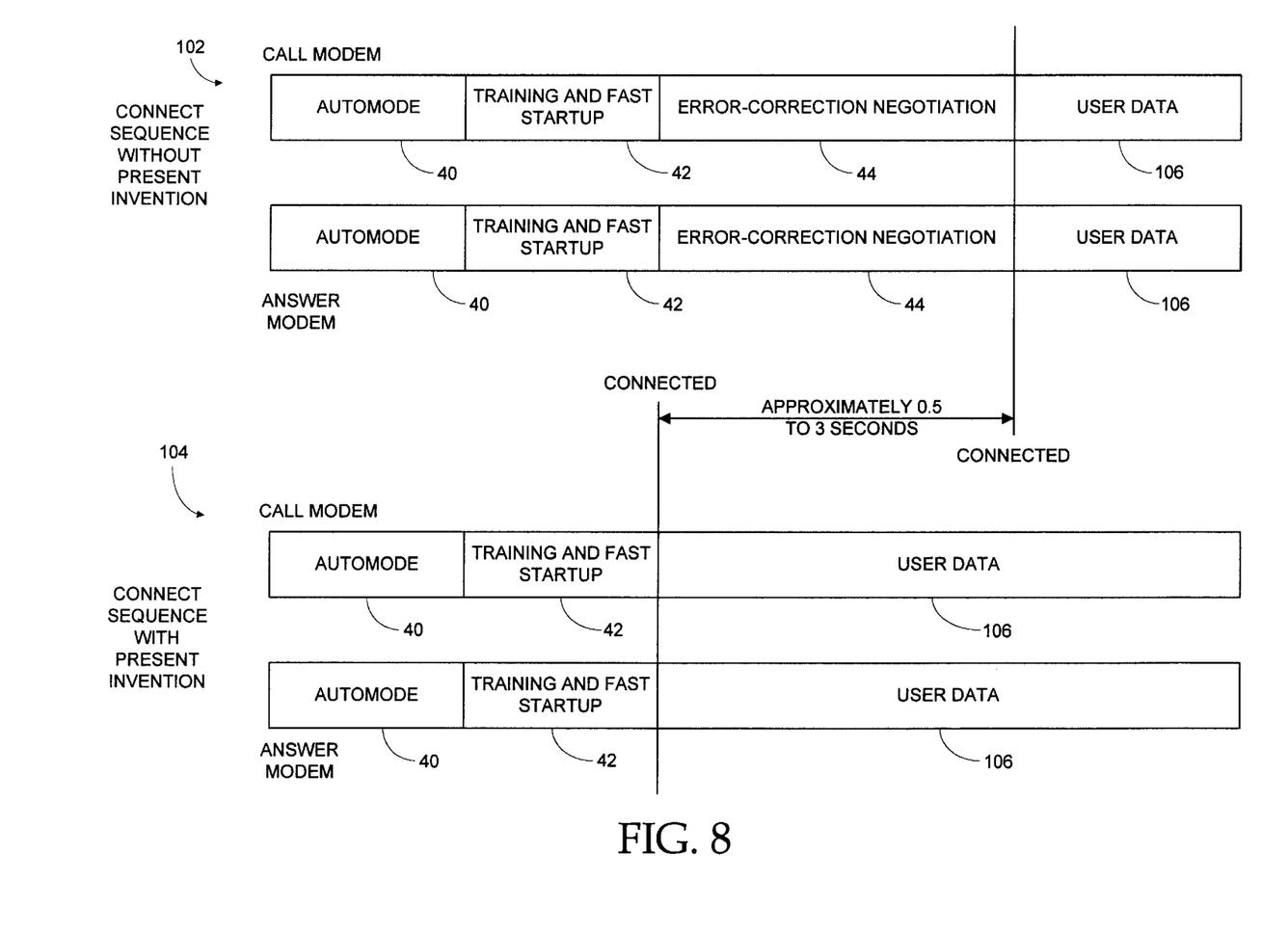
FIG. 8 is a schematic diagram comparing a first connect sequence of two fast connect modems with a conventional link layer connection and a second connect sequence of two fast connect modems with a link layer connection based on the physical layer negotiation in accordance with the present invention.

With reference to FIG. 8, a graphical illustration is provided of two fast connect modems in a first connect sequence 102 where error-correction negotiation is performed without the present invention and a second connect sequence 104 where the error-correction negotiation is performed with the present invention. As shown, following the mode synchronization sequence (also referred to as automode) 40 and the training and start-up sequence 42, the connect sequence 102 performs error-correction negotiation 44 which essentially doubles the time required for a connection to be established so as to allow user data 106 to be exchanged. In comparison, the connect sequence 104 in accordance with the present invention is able to establish a connection in essentially half the time by eliminating the error-correction negotiation 44. Thus, by establishing the error-correction parameters to default values in accordance with the type of physical error-connection determined by the automode sequence 40, a faster and more reliable connection is established.

Figure 9:
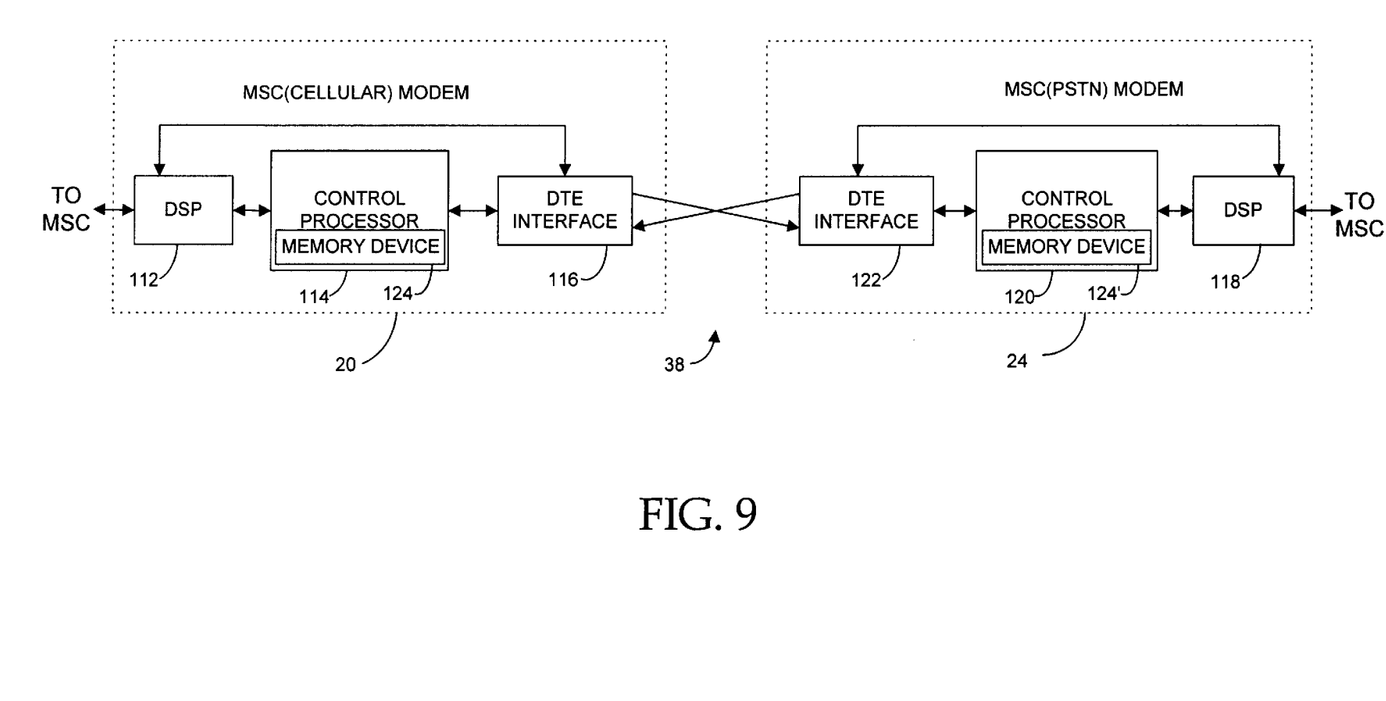
FIG. 9 is a block diagram of the modems comprising a data gateway connected to the mobile switching center of FIG. 1.

Regarding the implementation of the present invention, FIG. 9 generally illustrates the components of MSC (cellular) modem 20 and MSC(PSTN) modem 24 which implement the data gateway. The MSC(cellular) modem 20 comprises a digital signal processor (DSP) 112, a control processor 114, and a DTE interface 116. Likewise, the MSC(PSTN) modem 24 comprises a DSP 118, a control processor 120, and a DTE interface 122. The DTE interface 116 of the MSC(cellular) modem 20 interfaces with the DTE interface 122 of the MSC(PSTN) modem 24 via the connection 38, which can be implemented by any suitable interconnecting device such as, but not limited to, an Electronic Industry Association (EIA) standard RS-232 crossover or a backplane bus between the modems. As shown in FIG. 9, each modem 20, 24 is configured essentially the same, and thus, they operate in essentially the same manner. However, each modem is provided with operating code which is stored in a memory device 124, 124' provided with the central processor 114, 120, respectively, though additional memory can also be provided and connected to the control processor 114, 120, if necessary. In the context of the present disclosure, a memory device is a computer readable medium that is embodied in an electronic, magnetic, optical or other physical device or means that can contain or store a computer program, such as the operating code for the modem 20, 24, for use by or in connection with a computer related system or method. The operating code includes control logic that controls, among other things, the type of modulation and error correction techniques utilized which is dependent upon whether the modem is used for cellular or land-line connections. Accordingly, the control processor 114, 120 operates on, or executes, the operating code that is in memory device 124, 124' and configured for implementing the present invention so as to control the operation of modem 20, 24.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

Wherefore, the following is claimed:

1. A method for establishing a link layer connection between a calling modem having a plurality of possible first physical layer modulations and a plurality of possible link layer connections and an answering modem having a plurality of possible second physical layer modulations and a plurality of possible second link layer connections, comprising the steps of:

establishing a physical layer connection between said calling and said answering modems, wherein said physical layer connection is based on a negotiated physical layer modulation chosen from said first and second physical layer modulations; and establishing said link layer connection based upon said negotiated physical layer modulation.

2. The method of claim 1, wherein said negotiated physical layer modulation is a fast connect modem modulation.

3. The method of claim 1, wherein said link layer connection is an error-correcting protocol.

4. The method of claim 1, further comprising the step of presetting link layer parameters of said link layer connection to default settings based on said negotiated physical layer modulation.

5. The method of claim 3, wherein said error-correcting protocol includes parameters that are set to pre-defined settings based on said negotiated physical layer modulation.

6. A system for establishing a link layer connection between a calling modem having a plurality of possible first physical layer modulations and a plurality of possible link layer connections and a answering modem having a plurality of possible second physical layer modulations and a plurality of possible second link layer connections, comprising:

means for establishing a physical layer connection between said calling and said answering modems, wherein said physical layer connection is based on a negotiated physical layer modulation chosen from said first and second physical layer modulations; and means for establishing said link layer connection based upon said negotiated physical layer modulation.

7. The system of claim 6, wherein said negotiated physical layer modulation is a fast connect modem modulation.

8. The system of claim 6, wherein said link layer connection is an error-correcting protocol.

9. The system of claim 6, further comprising means for presetting link layer parameters of said link layer connection to pre-defined settings based on said negotiated physical layer modulation.

10. A computer program product having a computer readable medium including computer program logic recorded thereon for use in a calling modem for establishing a link layer convention between said calling modem having a plurality of possible first physical layer modulations and a plurality of possible link layer connections and an answering modem having a plurality of possible second physical layer modulations and a plurality of possible second link layer connections, comprising:

logic for establishing a physical layer connection between said calling and said answering modems, wherein said physical layer connection is based on a negotiated physical layer modulation chosen from said first and second physical layer modulations; and     logic for establishing link layer connection based upon said negotiated physical layer modulation.

* * * * *

UNITED STATES PATENT AND TRADEMARK OFFICE
CERTIFICATE OF CORRECTION

PATENT NO. : 5,852,631
DATED : December 22, 1998
INVENTOR(S) : Robert Earl Scott It is certified that error appears in the above-identified patent and that said Letters Patent is hereby corrected as shown below:

Column 14, line 54, delete the first instance of "a" and replace with -- an --;

Column 15, line 8, delete "convention" and replace with -- connection --; and

Column 16, line 8, after "establishing" insert -- said --.

Signed and Sealed this

Eighteenth Day of May, 1999

*Attest:*

*Attesting Officer*

Q. TODD DICKINSON

Acting Commissioner of Patents and Trademarks